United States Patent [19]

Dyken

[11] Patent Number: 4,878,545
[45] Date of Patent: Nov. 7, 1989

[54] AGRICULTURAL IMPLEMENT WITH FOLDABLE WING

[75] Inventor: Ray Dyken, Coaldale, Canada

[73] Assignee: Victory Equipment (1983) Limited, Alberta, Canada

[21] Appl. No.: 62,510

[22] Filed: Jun. 15, 1987

[51] Int. Cl.$^4$ ............................................. A01B 17/00
[52] U.S. Cl. ................................... 172/776; 172/311; 172/456
[58] Field of Search ............... 172/176, 730, 748, 311, 172/456, 776

[56] References Cited

U.S. PATENT DOCUMENTS

| 4,074,766 | 2/1978 | Orthman | 172/456 X |
| 4,207,950 | 6/1980 | Kinzenbaw | 172/456 |
| 4,415,043 | 11/1983 | Hadler et al. | 172/311 |

FOREIGN PATENT DOCUMENTS

| 1056194 | 6/1979 | Canada . |
| 1084329 | 8/1980 | Canada . |
| 1087016 | 10/1980 | Canada . |
| 1089281 | 11/1980 | Canada . |
| 1092879 | 1/1981 | Canada . |
| 1096226 | 2/1981 | Canada . |
| 1122471 | 4/1982 | Canada . |
| 1150561 | 7/1983 | Canada . |
| 1197130 | 11/1985 | Canada . |

*Primary Examiner*—Brian S. Steinberger
*Attorney, Agent, or Firm*—Parks, Thompson & MacGregor

[57] ABSTRACT

An agricultural implement having a wing frame which can be folded up relative to another portion of the frame from a working position to a transport position, and having a hinge connection between the frame which permits the wing frame to float relative to the other frame when in the working position but which readily accommodates pivoting of the wing to the transport position. The hinge connection includes pivot pins which provide a pair of parallel pivot axis so that the floating action of the wing frame is such that the wing frame can pivot about its inner end or in effect move straight up and down relative to the other frame, and thereby provide a motion by way of which the wing readily accommodates uneven terrain. While a type of universal floating action of the wing member takes place when in the working position, a simple type locking mechanism is included in the hinge so as to prevent pivoting about the axis of one of the pins when the wing frame is raised to the transport position. Thus in being raised the pivoting only occurs about the axis of the pair of axis. The implement may be provided with a power actuated unit which acts on the locking mechanism so as to move it to its locking condition on initial actuation to in effect transform the hinge connection from one which allows the floating action to one which permits pivoting about a single action. The hinge connection includes a hinge member which has the pivot pins at opposite ends thereof, one end connecting the hinge pin to the other frame and the other end connecting the wing frame to the hinge member. The locking mechanism is a lever to which the power unit is attached and is moved from one position in which it allows pivoting about both pins to another position in which it allows pivoting about only one pin. The structure is simple and therefore inexpensive relative to known structures, most of which do not allow the same universal type movement when in the working condition as the present hinge connection. The presnt hinge connection has substantially no addition parts to accomplish the automatic switch over from the normal working condition to a raising mode.

20 Claims, 2 Drawing Sheets

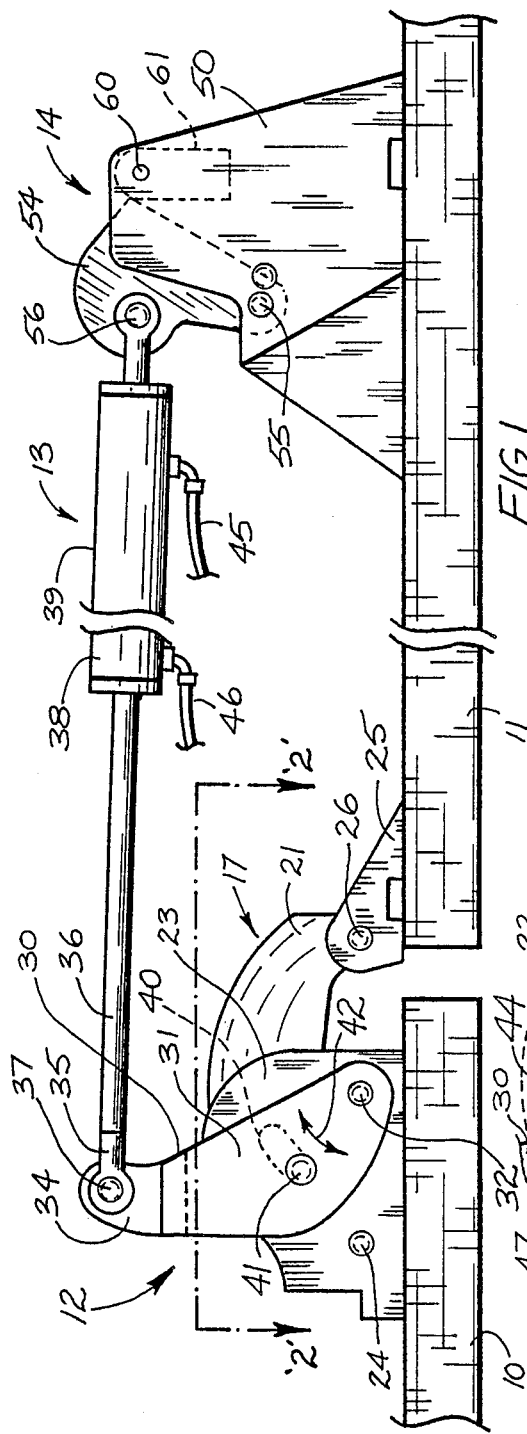
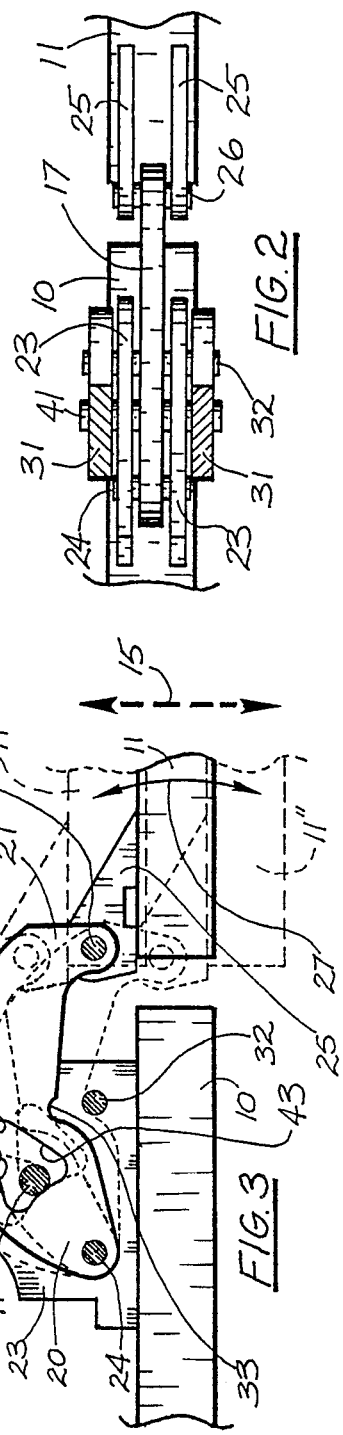

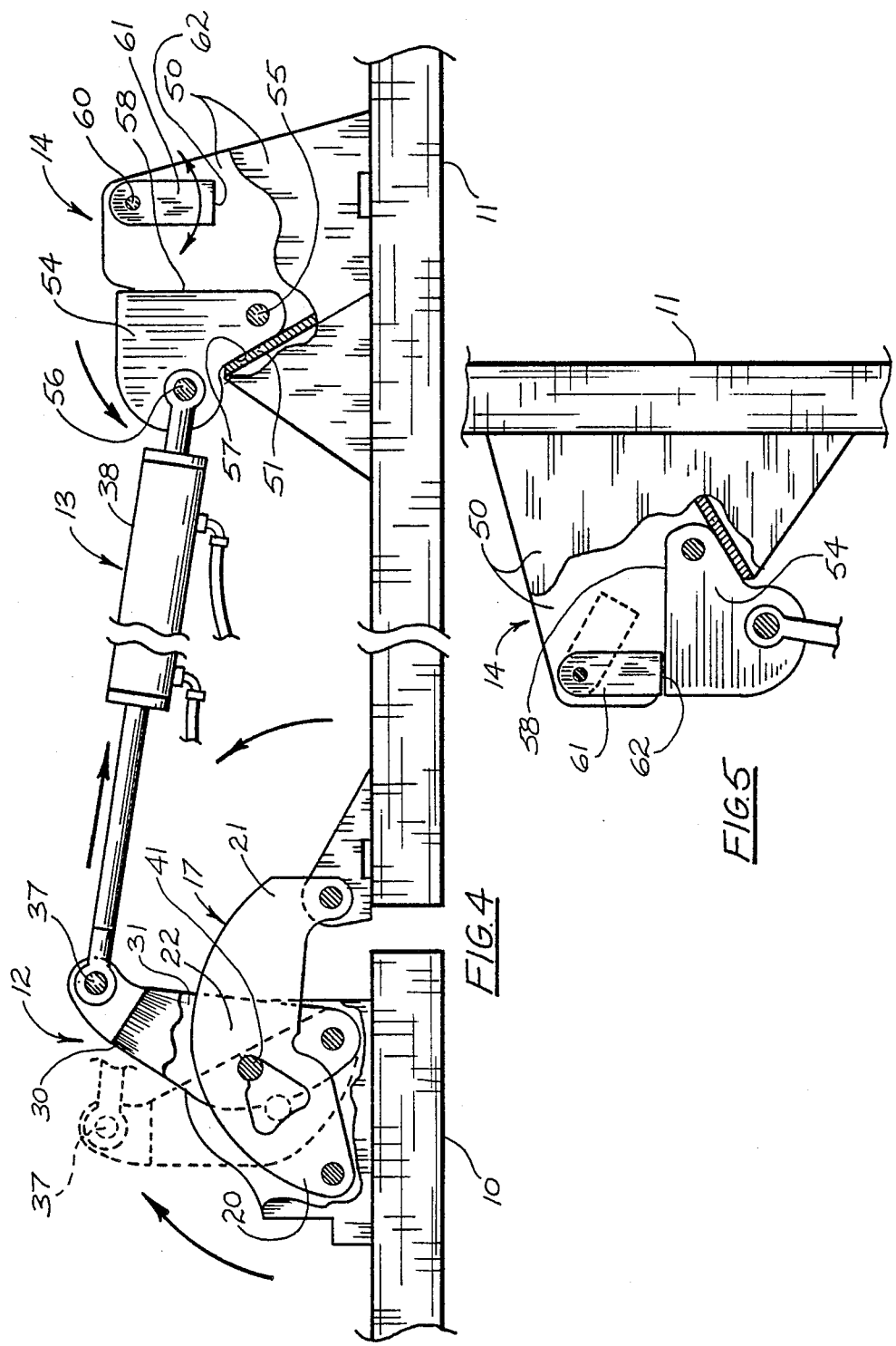

4,878,545

AGRICULTURAL IMPLEMENT WITH FOLDABLE WING

BACKGROUND OF THE INVENTION

1. Field of the Invention

This invention relates to an agricultural implement, and more particularly to a hinge structure which permits a wing structure to float relative to a main frame of the implement when in an working position but adjusts to a different mode to allow the wing to be folded upward to a transport condition.

2. Description of the Prior Art

Many agricultural implements, including earth tillage equipment, seeders, and crop harvesting equipment, are made up of a number of sections arranged end to end in the transverse direction so as to provide an wide implement capable of covering a wide swath on each pass. Usually the implement includes a main or central frame section mounted on its own wheel structure or other ground engaging means, and the other sections, which may be disposed at one or both ends of the central frame structure, are in the form of wings which may be folded upward to make the overall width less and thereby place the implement in a travel condition. When the outer or wing sections are in their lowered or work position, they are usually carried on their own wheels or other ground engaging means. In some known implements the pivot connection which is provided between the frame of the wing and the main frame is formed in a fashion to form a rigid connection between the main and wing frames when the wings are lowered to their operative position, but such a structure has the disadvantage of the ground working parts of the implement varying in their relation to the ground surface as the implement passes over uneven terrain. Such a deficiency in the implement increases, of course, as the width of the implement or the unevenness of the ground increases. Thus there have been designed pivoting connections between the main frame and the frames of the wings for allowing the wings to pivot relative to the main frame. Such an arrangement does not necessarily accommodate ground unevenness well because the wings only pivot about a single axis at their inner ends, and the relative motion enjoyed by the wings is not a true floating action. Although designs have been proposed to allow a more universal connection between implement wings and the main frame and thereby provide for a truer floating action of the wings, the designs have been generally complex and cumbersome. Most of the commercially adopted hinging mechanisms, whether of the type which allow relative movement between the wings and the main frame of the implement, and whether the permitted movement is simple that of allowing the wing to pivot relative to the main frame, have added significantly to the cost of the implement and/or require additional manipulation by the operator in the raising and lowering process. If provision is made to accommodate some form of lost motion in achieving a floating action of the wing, some form of mechanism must also be present to override the lost motion during raising and lowering of the wing, and generally, such mechanisms require separate inconvenient operation by the user of the implement or the addition many extra parts to bring about a more automatic response to the raising of the wing.

SUMMARY OF THE INVENTION

It is an object of the present invention to provide an hinge connection between the wing and the main frame of an agricultural implement to allow for a true floating action of the wing relative to the main frame.

It is a further object of the present invention to provide a hinge mechanism which is a simple and inexpensive structure.

An object of a specific embodiment of the invention is to provide a hinge connection which automatically converts the hinge connection to a condition to allow raising of the wing on actuation of the raising mechanism and further requires no special setting when the wing has been lowered to the operating condition.

According to the present invention, there is provided an implement including a first frame and a wing frame connected to the first frame by hinge means which permits pivoting of the wing frame to a raised position relative to the first frame. The hinge means includes a hinge member having a first pivot means connecting the hinge member to the first frame and allowing turning movement of the hinge member about a horizontal axis relative to the first frame member and a second pivot means connecting the hinge member to the wing frame and allowing turning movement of the wing frame relative to the hinge member about a second horizontal axis spaced from and parallel to the axis of the first pivot means. The hinge is provided with locking means movable between locking and unlocking positions. The locking means in the unlocked position permits the turning movements of both pivot means so that the wing frame is mounted for limited float upward and downward relative to the first frame. In the locked position, the locking means permits the turning movement about the axis of only one of the two pivot means so that the wing frame can be pivoted to the raised position about the axis of the unlocked pivot means.

The structure of the present invention is of a simple nature, but because the hinge as a pair of pivoting axis which are spaced on the hinge member, the wing frame can experience an up and down motion overall, instead of a simple pivoting motion about its one end connected to the first or main frame. This type of motion allows the wing frame to more accurately follow the ground contour. Moreover, by providing a locking means which has the effect of locking pivoting about one of the two axis, a pivoting motion about the unlocked pivoting means allows for a simple pivoting of the wing about a single axis when the wing is raised or lowered.

In a specific embodiment of the invention, the implement is provided with a power means operable to raise and lower the wing on actuation thereof. The power means may be arranged to engage the locking means for moving it to the locking position on initial actuation thereof. Thus, after completing normal use of the implement and it is desirable to move the implement elsewhere, the power actuated means is actuated, usually from the operating cab of the implement of the tractor being used to draw the implement, and the locking means is immediately effective to lock out the capability of the hinge to provide pivoting about two axis so that the wing is raised by the wing being pivoted about a single action on continued action by the power means.

In the accompanying drawings which show one embodiment of the invention, as an example:

FIG. 1 is a rear or front view of a portion of an agricultural implement showing a hinge connection between two sections of the implement, on of which can pivot relative to the other to a raised transport position;

FIG. 2 is a top and partially sectional view of the hinge connection as viewed from line 2—2 FIG. 1;

FIG. 3 is a view similar to FIG. 1, but showing the hinge connection with parts removed for the sake of clarity;

FIG. 4 is also a view similar to FIG. 1, but with parts of the hinge connection removed and also a portion of the connection at the outer end the lifting means cut away for the sake of clarity, and wherein the parts are shown in the position occupied when the lifting means is initially actuate; and FIG. 5 is a cut away view of the connection at the outer end of the lifting means showing the position of the parts when the wing member is in a raised position.

In the drawings, the entire agricultural implement is not shown, but it can be appreciated that it may be one of numerous types of implements which travel over the surface of the ground on wheels or other ground engaging means supporting the implement. The implement may be provide with ground tillage tools, surface packers or planting fixtures. Alternatively, the implement may be a crop swathing machine or other types of harvesting equipment. Moreover, the implement may be self-propelled or designed to be drawn by a tractor.

It is of course desirable to provide very wide implements so as to accomplish more work on each pass and thereby reduce the total time needed to carry out any particular earth working, planting or harvesting function. However, in order to travel on roadways, pass through gates, enter storage sheds, etc., it must be possible to reduce the total width of the implement. As in most know implements, the present invention achieves this narrowing function by folding wing sections relative to a central or main frame section, which is usually the section which is provided with the draw means for attachment to a pulling means, such as a tractor, when the implement is not self-propelled.

In the drawings, the part, which may be the frame of the main section of the implement, or alternatively, the inner section of a multi-section wing, is denoted by the reference charter 10. The frame of the wing which folds up relative to the frame 10, or the part of the wing which folds up relative to another section of the wing 10, is denoted by the reference character 11. The frame 11 of the wing is connected to the frame 10 by a hinge means or connection hinge generally denoted 12. The wing is raised to a travel mode by power means 13, which is connected between the hinge connection 12 and a connection in the form of a pivot means 14 affixed to the wing frame 11.

The frames 10 and 11 are shown in the form of elongated members, which, in operation, are in substantially end to end alignment and normally extend transversely of the implement. To reduce the width of the implement for travel along a roadway, for example, the hinge connection 12 permits the wing frame 11 to be pulled by the power means 13 to a substantially vertical position as indicated in FIG. 5. Moreover, as will become more apparent from the following description, the hinge connection 12 also permits the wing frame 11 to in effect have a limited floating action relative to the frame 10 when the wing is in its operative position, this motion being indicated by the positions shown by dashed lines and the double-headed arrow is in FIG. 3. The floating action is not merely a pivoting of the frame 11 about its inner end, but may provide a combined type motion including such pivoting, as indicated by curved, double-headed arrow 27, and also an overall up and down motion as allowed by a pair of pivots as will become more apparent from the following description.

The hinge connection 12 includes a hinge member 17, which is shown as a flat plate-like member is elongated so as to have spaced inner and outer ends 20 and 21 with an intermediate or central portion 22 (see particularly FIG. 4). The hinge member 17 has pivot means at both its inner end and outer end connecting it to the main frame 10 and wing frame, respectively. More specifically, the main frame 10 is provided with a pair of spaced parallel lugs 23 affixed to the top thereof and projecting upwardly, the hinge member 17 being mounted therebetween. A pin 24, which extends through aligned holes in the inner end of the hinge member and the lugs 23, allows the hinge member 17 to turn about a horizontal axis, which would normally extend in the direction of travel of the implement. The wing frame 11 also has a pair of spaced upwardly projecting lugs 25, and the outer end 21 of the hinge member 17 extends between the lugs 25. The wing frame is connected to the hinge member by a pin 26 which extends through aligned holes in the lugs 25 and the outer end 21 of the hinge member 17 so that the wing frame can turn relative to the hinge about horizontal axis which is parallel to the axis provided at the inner end of the hinge member by the pin 24.

Because the inner end of the wing frame 11 is connected to the main frame 10 by way of a pair of parallel pivot axis, a universal floating action is obtained in the vertical plane. The wing frame 11 can float straight up and down to the positions indicated by dashed lines, and as indicated by the double headed arrow 15, or the wing frame 11 can pivot about the axis of pin 26 as indicated by the curved double headed arrow 27 so that the outer end of the wing member is higher or lower than its inner end. In the main, however, the motion of the wing member would be a combination of those two motions so that the wing member is capable of closely following the contour of the ground which is to the right of the main frame 10 as viewed in FIG. 2.

The hinge connection 12 further has a locking means which includes a member in the form of a lever 30 having a lower portion formed by a pair of spaced legs 31 which straddle the lugs 23 and are pivotally connected thereto by a pivot pin 32. The pin 32, which is disposed in an area between pins 24 and 26, extends through aligned openings in lugs 23 and legs 31 so that the lever can turn about an axis parallel to the axis of pin 24. The pin 32 extends between the lugs 23 below the lower surface of the hinge member 17, the lower surface being indented as at 33 where the hinge member engages the pin 32 as the hinge member moves down whereby the pin 32 provides a stop to limit the movement of the wing frame downwardly relative to the main frame. The upper end of the lever 30 presents an upwardly projecting lug 34 which is received in a clevis 35 formed on the outer end of a piston rod 36 of a hydraulic piston and cylinder type motor 38 which provides the power means 13. The clevis 35 is attached to the lever 30 by way of a pin 37 which extends through aligned openings in the clevis 35 and the lug 34.

The lugs 23 have arcuate slots 40 therein which are struck about the axis of pivot pin 32, and a cross shaft or pin 41 extends between the pair of legs 31 of the level 30, and the pin moves back and forth in slot 40 as the lever is rocked back and forth as indicated by double headed arrow 42 is FIG. 1, engagement of the pin with the end opposite ends of the slots providing the limit stops for the turning of the level 30 in either direction. The hinge member 17 is provided with a triangular shaped opening 43 in the central portion thereof, and the pin 41 extends through the opening 43 (see FIG. 3). The triangular opening is centrally disposed on a radial line extending outwardly from the axis of pin 24, with the apex 44 of the opening 43 being positioned the farthest away from the axis. One side of the triangular opening immediately adjacent the apex 44 may be provided with a slight protuberance 47 for resisting movement of the pin 41 away from the apex 44 once the lever 30 has moved into its locking position. The apexes of the triangular opening 43 are preferably rounded to correspond to the shape of the pin 41. Thus, when the lever 30 is turned as far as it can go in the counterclockwise direction the pin is at the base of the triangular opening as shown in FIG. 3, and the hinge member is free to rock back and forth to the extent allowed between engagement of the pin with the corners of the triangular opening at opposite ends of the base. The extreme positions of the hinge member 17 are indicated by dashed lines which allow the positions of the wing frame 11' and 11" shown in FIG. 3. When the lever 30 is rocked in the opposite direction, i.e., the clockwise direction, the pin 42 moves to the apex 44 of the opening 43 which prevents any rocking movement of the hinge member, that is, the hinge member is effectively locked against pivoting about the axis of pin 24. In such a locked position of the hinge pin 17, the wing frame is still free to pivot about the axis of pin 26.

It will be appreciated that a very similar locking arrangement could be provided by equipping the hinge member 17 with a cross pin which projects from opposite sides thereof into triangular openings in the legs of the lever. In such an arrangement the triangular opening would have to be oriented in the opposite direction. Furthermore, while in the specific embodiment which has been illustrated, the locking affect is in connection with pivoting about the axis of the pin 24, the same function could be accomplished by locking against pivoting of the wing frame relative to the hinge member 17. An important aspect of the invention is, however, that in one mode there is allowed pivoting about both of the parallel axis of the hinge member to accomplish the floating action of the wing frame, while in another mode, pivoting can take place only about one of the axis so that the wing member can pivot to a raised position.

As previously described, one end of the hydraulic motor 38 is pivotally connected to the lever 30, the motor 38 being a double acting cylinder so that when pressurized fluid is admitted to one or the other end of cylinder 39 via conduit 46 or conduit 47, the piston rod either retracts or extends, respectively. When the motor is initially contracted in the operation of raising the wing frame, the lever is pulled in a clockwise direction to bring about the above described locking of the hinge member against pivoting so that on further contraction, pivoting of the wing frame has to take place about the axis of the pin 26 at the outer end of the hinge member 17.

The pivot means 14 at the outer end of the hydraulic motor includes a pair of spaced parallel side plates 50 affixed to and projecting upwardly from the wing frame 11. A plate 51 is affixed between the side plates 50 so as to provide a sloped abutment. Pivotally connected between side plates 50 by way of a pin 55 outwardly of the abutment 51 is an arm 54 to which the hydraulic motor 38 is connected at its outer end. The connection between the hydraulic motor 38 and the upper end of arm 54 is by way of a pin 56, the axis of pivot provided by both the pins 55 and 56 being parallel to the axis of pivot of the pin 37. Also pivotally connected between side plates 50 by way of a pivot pin 60 is a dog 61 which normally hangs in a free vertical position as shown in FIG. 4. The dog has a lower arm engaging surface or end 62, which under certain conditions engages a back side 58 of the arm 54.

When the wing frame is in its operative or lowered position, i.e., the hydraulic motor is extended, the arm 54 is free to move away from the abutment 51 so as to allow for lost motion in the pivot means 14. When the hydraulic motor 38 is contracted, however, a front surface 57 of the arm 54 is pulled against the abutment 51 and initially lever 30 is pulled to its locking position as previously described. On further contraction of hydraulic motor 38, the wing member starts to pivot about the axis of pin 26 and this continues until the wing frame 11 is substantially vertical as indicated in FIG. 5. When the wing member 11 is in its vertical position, the dog 61 swings by way of gravity so that its arm engaging end 62 is adjacent the back surface 58 of the arm 54. Accordingly, when the hydraulic motor 38 is first actuated to push the arm towards its down position, the arm 54 is prevented from moving away from the abutment 51 and the dog 61 is in effect trapped in its arm engaging position. Once the wing frame has passed over centre in its downward travel, the hydraulic motor is actually under tension due to weight of the wing structure, and the speed of the lowering action is controlled by the flow of the fluid from the inner end of the cylinder. Thus, the arm 54 is held tightly against the abutment 51, and the dog 61 is free to pivot under the influence of gravity back to its hanging position. When the wheels or other ground engaging means of the wing frame engages the ground, the final expansion of the cylinder pushes the lever 30 back to its unlocking condition. At this point the wing frame can again assume a floating condition relative to the main frame 10 and because of the dog 60 having swung back to its free hanging position, arm 54 can move away from the abutment 51.

From the above, it can be seen that the hinge connection 12 is of relatively simple structure and yet without any manual adjustment being required by the operator, achieves a superior type floating action of the wing frame relative to the main frame while allowing for simple folding action of the wing to a raised position about a single pivot pin.

While only a single embodiment has been shown, it will be obvious to those skilled in the art that numerous variations are possible without departing from the spirit of the invention as defined in the appending claims.

What I claim is:

1. An implement including a first frame and a wing frame connected to said first frame by hinge means to permit pivoting of said wing frame a lowered operating position to a raised transport position relative to said first frame; said hinge means including a hinge member having a first pivot means connecting said hinge member to said first frame and allowing turning movement of said hinge member about a horizontal axis relative to said first frame and a second pivot means connecting said hinge member to said wing frame and allowing turning movement of said wing frame relative to said hinge member about a second horizontal axis spaced from and parallel to the axis of first pivot means, and locking means movable between locking and unlocking positions, said locking means in the unlocking position permitting the turning movements of both said pivot means whereby said wing frame in said operating position is free for limited float upward and downward relative to said first frame, lock actuating means operable when said wing frame is in said operating position for moving said locking means to said locking position for preventing the turning movement about one of said first and second pivot means, and a wing frame raising means operable after operation of said lock actuating means for pivoting said wing frame about the other of said first and second pivot means to the transport position.

2. An implement as defined in claim 1, wherein said locking means is engagable with said hinge member for preventing said turning movement of said hinge member about the horizontal axis of the first pivot means.

3. An implement as defined in claim 2, wherein said locking means includes a lever member pivotally connected to said first frame by way of a third pivot means allowing turning of said lever member on a axis parallel to the axis of the first pivot means.

4. An implement as defined in claim 3, wherein said lever member is pivotable between two extreme positions and is provided with means engagable with said hinge member in one of said positions to prevent said hinge member from turning about said axis of said first pivot means.

5. An implement as defined in claim 4, wherein said raising means and said lock actuating means comprises an axial extendible and contractible power means for pulling said wing frame to the raised position on contraction thereof, said power means being connected at an end thereof to pivot means on said wing frame and connected at an inner end to pivot means on said lever member whereby on initial contraction of said power means, said lever member is pulled to said one position and on further contraction said wing frame is pulled upwardly and pivots about the axis of said second pivot means.

6. An implement as defined in claim 5, wherein said pivot means on said wing frame includes an arm having a first pivot connection between one end thereof and said wing frame and a second pivot connection between the other end thereof and the outer end of said power means, said first pivot connection of said arm providing a pivot axis parallel to said axis of said first pivot means between said hinge member and said first frame, and abutment means engagable by said arm on contraction of said power means whereby the pulling force of said power means is transmitted to said wing frame through engagement of said arm with said abutment means for raising said wing frame.

7. An implement as defined in claim 6, wherein said pivot arm is free to pivot at least a limited degree in a direction away from said abutment means said wing member is in a lowered position whereby lost motion is allowed between the outer end of said power means and said wing member.

8. An implement as defined in claim 7, wherein said pivot means on said wing frame has a locking device for preventing said pivoting of said arm in the direction away from said abutment when said frame is in the raised position whereby extending of said power means pushes said wing frame toward a lowered position from said raised position.

9. An implement as defined in claim 8, wherein one side of said arm is engagable with said abutment means and a dog is engagable with an opposite side of aid arm to form said locking device for preventing said arm from pivoting away from said abutment means.

10. An implement as defined in claim 9, wherein said dog being free to swing into an arm engaging position by gravity when said wing frame is pulled by said power means to the raised position and is free to swing to a non-engaging position by gravity after said wing member has been returned to the lowered position.

11. An implement as defined in claim 3, wherein one of said hinge and lever members is provided with an opening and the other of said hinge and lever members has a transverse pin received in said opening and being movable therein to a locking portion of said opening when said lever member is pivoted about the axis of said third pivot means, the engagement of said pin within said locking portion of said opening preventing said turning movement of said hinge member about the axis of the first pivot means.

12. An implement as defined in claim 1, wherein said raising means includes power means operable to raise said wing frame on actuation thereof, and wherein said lock actuating means includes said power means, said lock actuating means engaging said locking means for moving said locking means to said locking position on initial actuation of said power means.

13. An implement as defined in claim 1 wherein said raising means comprises an axial extendible and contractible power means for pulling said wing frame to the raised position on contraction thereof, said power means being connected at an end thereof to pivot means on said wing frame and connected at an inner end to said main frame whereby on contraction of said power means after operation of said actuating means said wing frame is pulled upwardly and pivots about the axis of the other of said first and second pivot means.

14. An implement as defined in claim 13, wherein said pivot means on said wing frame includes an arm having a first pivot connection between one end thereof and said wing frame and a second pivot connection between the other end thereof and the outer end of said power means, said first pivot connection of said arm providing a pivot axis parallel to said axis of said first pivot means between said hinge member and said first frame, and abutment means engagable by said arm on contraction of said power means whereby the pulling force of said power means is transmitted to said wing frame through engagement of said arm with said abutment means for raising said wing frame.

15. An implement as defined in claim 14, wherein said pivot arm is free to pivot at least a limited degree in a direction away from said abutment means when said wing member is in a lowered position whereby lost motion is allowed between the outer end of said power means and said wing member.

16. An implement as defined in claim 15, wherein said pivot means on said wing frame has a locking device for preventing said pivoting of said arm in the direction away from said abutment when said frame is in the raised position whereby extending of said power means pushes said wing frame toward a lowered position from said raised position.

17. An implement as defined in claim 16, wherein one side of said arm is engagable with said abutment means and a dog is engagable with an opposite side of said arm to form said locking device for preventing said arm from pivoting away from said abutment means.

18. An implement as defined in claim 17, wherein said dog is free to swing into an arm engaging position by gravity when said wing frame is pulled by said power means to the raised position and is free to swing to a non-engaging position by gravity after said wing member has been returned to the lowered position.

19. An implement comprising a first frame and a wing frame connected to said first frame by hinge means to permit pivoting of said wing frame to a raised position relative to said first frame; said hinge means including a hinge member having a first pivot means connecting said hinge member to said first frame and allowing turning movement of said hinge member about a horizontal axis relative to said first frame and a second pivot means connecting said hinge member to said wing frame and allowing turning movement of said wing frame relative to said hinge member about a second horizontal axis spaced from and parallel to the axis of first pivot means, and locking means including a lever member pivotally connected to said first frame by way of a third pivot means allowing turning of said lever member on a axis parallel to the axis of the first pivot means between locking and unlocking positions, one of said hinge and lever members being provided with an opening of a triangular configuration and having a locking portion at one apex of a triangle configuration, and the other of said hinge and lever members having a transverse pin received in said opening and being movable relative to the opening between a position at the locking portion and a portion adjacent the base of the triangle configuration when said lever member is pivoted between said locking and unlocking positions, said pin, when at said locking portion, preventing movement of said hinge member relative to said lever member and thereby preventing said turning movement of said hinge member about the axis of the first pivot means, whereby said wing frame may be pivoted to the raised position about said second pivot axis, and the pin, when positioned adjacent the base of the triangular configuration, permitting movement of the hinge member relative to the lever member and about the axis of the first pivot means, whereby the turning movements is permitted about both axes and said wing frame is free for limited float upward and downward relative to said first frame.

20. An implement as defined in claim 19, wherein said hinge member includes a central portion provided with said opening between said pivot means, and said lever member includes a pair of leg members of like profile straddling said central portion, said pair of members being pivotally mounted on said third pivot means located between the first and second pivot means, said pin being parallel to the axis of said pivot means and extending between said pair of leg members and through said opening.

* * * * *